United States Patent [19]

Kang et al.

[11] 4,159,755

[45] Jul. 3, 1979

[54] SAFETY HYDRAULIC BRAKE SYSTEM FOR AUTOMOTIVE VEHICLES

[76] Inventors: Byung K. Kang, 379-2, Jungneun-dong, Sungbook-ku, Seoul; Jin C. So, 151-3, Choonglim-dong, Choong-ku, Seoul; Tae H. Chung, 132-74, 1-ka, Do-dong, Yongsan-ku, Seoul; Won Choi, 167-77, Chunho-dong, Gangnam-ku, Seoul, all of D.P.R. of Korea

[21] Appl. No.: 855,999

[22] Filed: Nov. 30, 1977

[51] Int. Cl.$^2$ .............................................. B60T 11/32
[52] U.S. Cl. .................................. 188/151 A; 60/579; 60/582; 60/591; 188/352; 303/84 A
[58] Field of Search ............. 188/151 A, 352; 60/571, 60/579, 580, 582, 591; 303/84 A; 137/460

[56] References Cited

U.S. PATENT DOCUMENTS

| | | | |
|---|---|---|---|
| 2,216,570 | 10/1940 | Hollingshead | 303/84 A |
| 2,249,227 | 7/1941 | Press | 60/581 X |
| 2,585,511 | 2/1952 | Sparks et al. | 303/84 A X |
| 2,650,863 | 9/1953 | Fore | 303/84 A |
| 2,992,535 | 7/1961 | Barragan | 60/580 |
| 3,232,057 | 2/1966 | Kersting | 303/6 C X |
| 3,738,709 | 6/1973 | Stokes | 303/84 A X |

FOREIGN PATENT DOCUMENTS

76744 4/1950 Norway ................. 188/151 A

*Primary Examiner*—George E. A. Halvosa
*Attorney, Agent, or Firm*—Finnegan, Henderson, Farabow & Garrett

[57] ABSTRACT

A safety hydraulic brake system for automotive vehicles which includes a control cylinder having an inlet connected to a hydraulic pressure source, and first and second outlets connected to brake cylinders at front and rear wheels, respectively. A valve is located at each outlet and normally allows pressurization of the front and rear wheel cylinders upon actuation of the hydraulic pressure source. First and second pistons, each having a by-pass valve, are slidable in the control cylinder. The pistons and by-pass valves are operable, when there is a loss of brake pressure in the lines to one set of brake cylinders, to effect closing of the control cylinder valve to that brake cylinder set. This allows brake pressure to be maintained at the other set of wheel cylinders and the vehicle to be safely braked. In addition, for heavy vehicles such as buses and trucks, an additional control cylinder device can be incorporated providing separate braking systems for each of the rear wheels so that loss of brake pressure to one rear wheel does not affect brake pressure at the other. Further, the system is designed to accomodate ready air bleeding from the brake lines.

7 Claims, 16 Drawing Figures

SAFETY HYDRAULIC BRAKE SYSTEM FOR AUTOMOTIVE VEHICLES

SUMMARY OF THE INVENTION

The present invention is directed to an improved safety hydraulic brake system for automotive vehicles which provides, in effect, separate systems for the front and rear wheel brakes so that loss of brake pressure in the hydraulic line to one set of wheels does not affect hydraulic pressure or the braking effect at the other wheels. The invention is carried out using a single control cylinder device having an inlet connected to a pressure developing means for the vehicle, and a pair of outlets connected by hydraulic lines to the front and rear wheel brake cylinders, respectively. Valve means is provided at each of the control cylinder outlets, and normally allows pressurization of the front and rear wheel cylinders upon actuation of the pressure developing means. Piston means in the control cylinder is acted upon by the pressure developing means and controls brake pressure to the wheel cylinders. However, when a pressure drop occurs in the hydraulic line to either the front or rear wheel cylinders such as, for example, as a result of a broken wheel cylinder or a leak in that hydraulic line, the piston means causes the valve means at the control cylinder outlet connected to that brake line to close. This prevents any further pressure loss and permits the vehicle to be safely braked by pressurization of the other wheel cylinders. The piston means includes by-pass valve means which insures proper positioning and travel of the piston means during brake actuation and release.

As described, the invention can be carried out by a single control cylinder device serving both sets of front and rear wheel cylinders. However, and particularly in the case of heavy vehicles, such as buses and trucks, an additional control cylinder device can be connected to the first mentioned control cylinder device and between the wheel cylinders at the rear wheels of the vehicle. In this case, and in addition to the safe operation described above, loss of pressure at one of the rear wheel cylinders does not affect braking action at the other of the rear wheel cylinders.

Furthermore, in the case of vehicles having more than two sets of wheel cylinders, additional similarly constructed control cylinder devices can be employed to insure that loss of brake pressure at one set of wheels does not affect brake pressure at the other wheels.

Still further, the invention is constructed so that air can readily be bled from the hydraulic system in a conventional manner.

Main objects of the present invention, therefore, are to provide an improved safety hydraulic brake system for automotive vehicles constructed to insure that loss of brake pressure in the hydraulic line to one set of vehicle wheels does not affect hydraulic pressure or the braking effect at the other sets of wheels, and that the vehicle can be safely braked under these conditions.

Further objects of the present invention are to provide a safety hydraulic brake system of the above character which can be achieved using a single control cylinder device in vehicles having one set of front wheel cylinders and one set of rear wheel cylinders, and wherein a second control cylinder device can be interposed between the rear wheel cylinders in heavier vehicles having one set of front wheel cylinders and one set of rear wheel cylinders to additionally insure braking action at one rear wheel cylinder upon loss of braking pressure at the other rear wheel cylinder.

A still further object of the present invention is to provide a safety hydraulic brake system of the above character wherein for vehicles having more than two sets of wheel cylinders, additional such control cylinder devices can be provided so that loss of braking pressure in any one set of wheel cylinders does not affect the braking pressure at the other set of wheel cylinders.

An additional object of this invention is to provide a safety hydraulic brake system of the above character which allows air to be bled from the hydraulic system in ready fashion.

Still further objects of the present invention are to provide a safety hydraulic brake system of the above character which is relatively inexpensive to manufacture, rugged in construction, reliable in use and which requires a minimum of change in existing hydraulic brake systems.

Other objects and advantages of the present invention will become apparent from a consideration of the detailed description to follow taken in conjunction with the appended claims.

To achieve the foregoing objects and in accordance with the purpose of the invention as embodied and broadly described herein, the safety hydraulic brake system of this invention comprises a control cylinder having a first outlet communicated with the brake cylinders at the front wheels of the vehicle, and a second outlet communicated with brake cylinders at the rear wheels of the vehicle, an inlet in the control cylinder communicated with a hydraulic pressure developing means, bore means in the control cylinder communicated with the first and second outlets, first and second piston means in the bore means, first and second valve means in the bore means and operable to permit pressurization of the front and rear wheel brake cylinders upon actuation of the hydraulic pressure developing means, the first and second piston means being operable to effect closing of the first or second valve means upon loss of pressure at the front or rear wheel cylinders, respectively, whereby to prevent loss of brake pressure at the other of said front and rear wheel cylinders upon actuation of the hydraulic pressure developing means.

DETAILED DESCRIPTION

Figure 1:
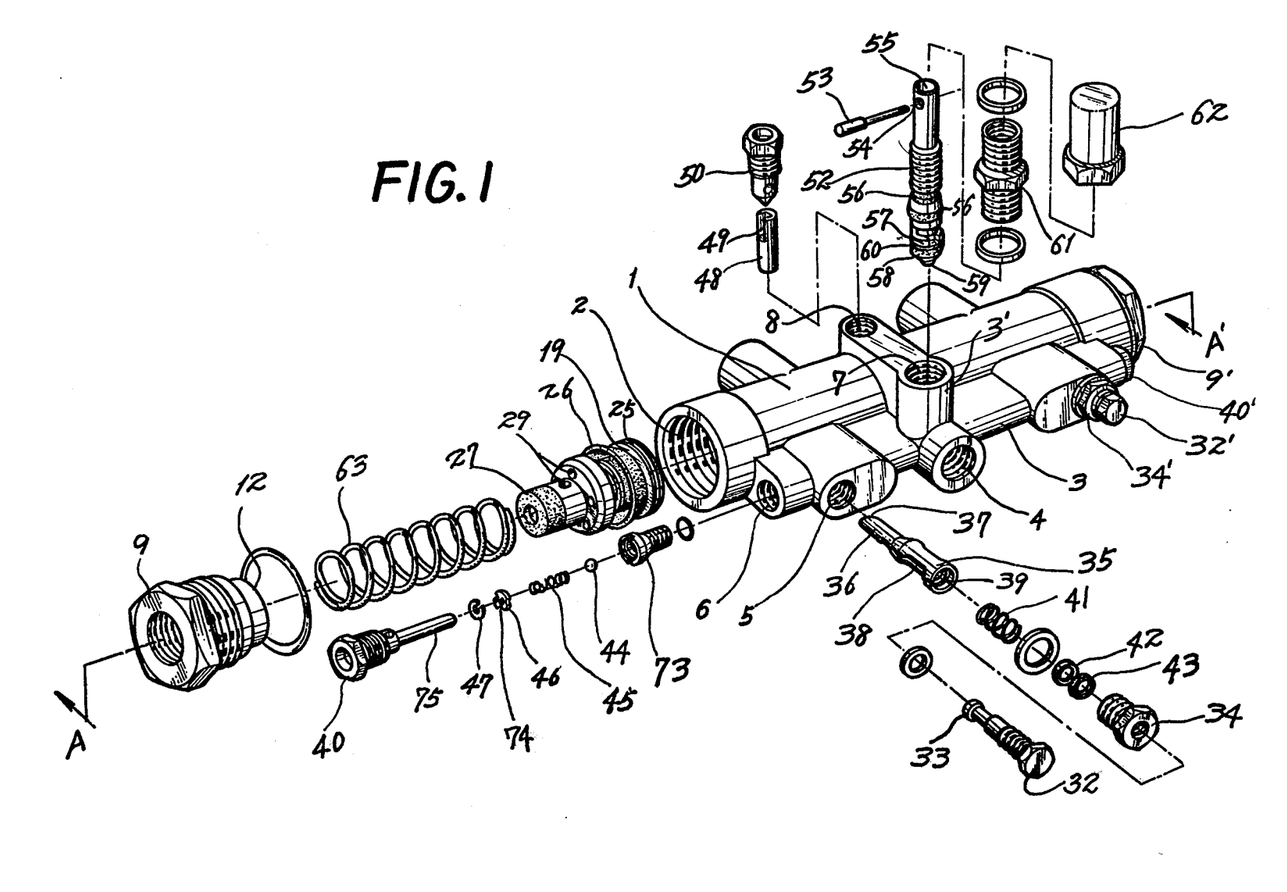
FIG. 1 is an exploded perspective view showing a control cylinder constructed according to the present invention.
Figure 2:
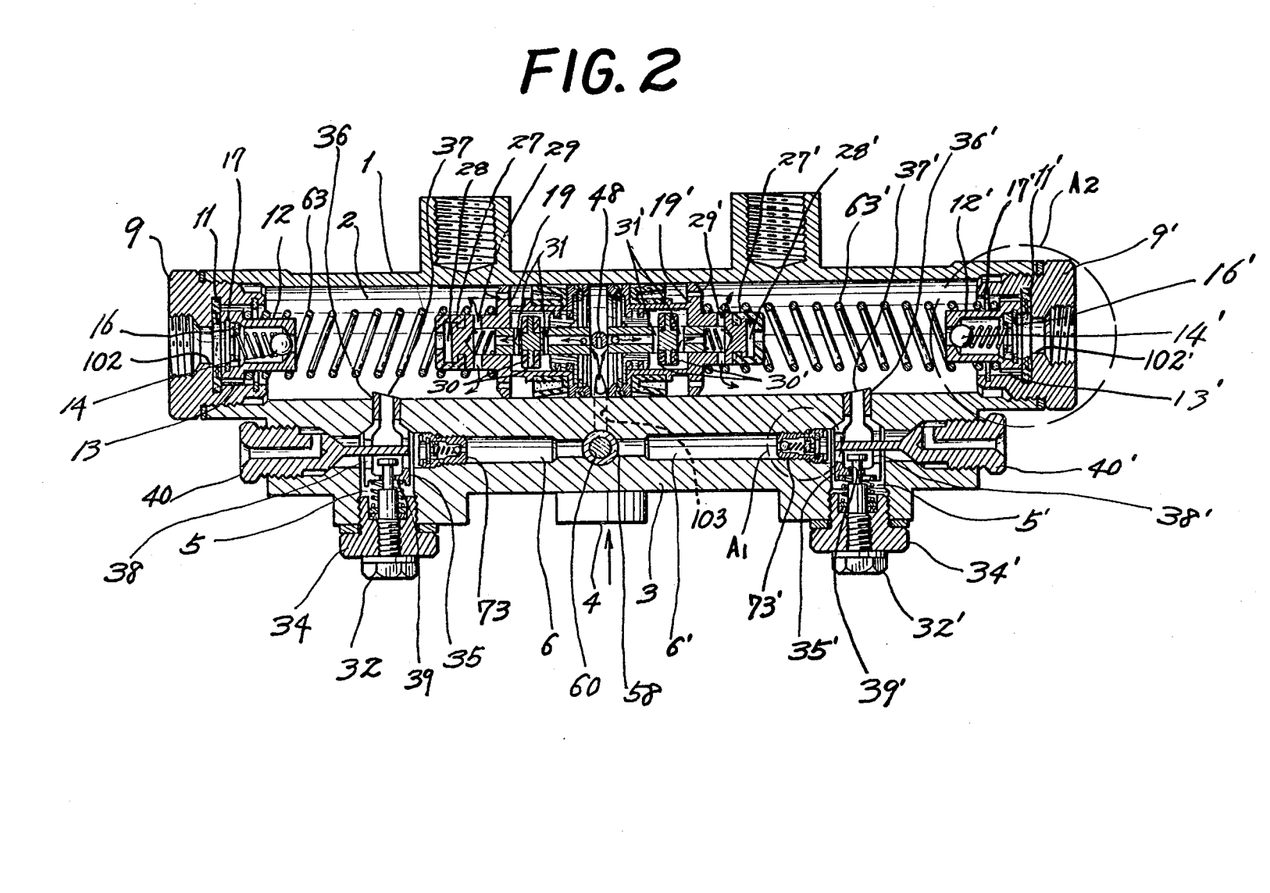
FIG. 2 is a sectional view of FIG. 1 taken along the line A—A' thereof, and showing the parts in position with the hydraulic pressure unactuated and the brakes released.

Referring now more specifically to the drawings and particularly FIG. 1 and 2, a control cylinder constructed according to the present invention includes a housing 1 having bore means including a through bore 2 formed therein. A pair of plugs 9, 9' are threaded into opposite ends of the bore 2 and are provided with openings 102, 102' forming outlets of the control cylinder. Housing 1 also includes an inlet 4 which communicates with bore 2 through a passage 103.

Figure 14:
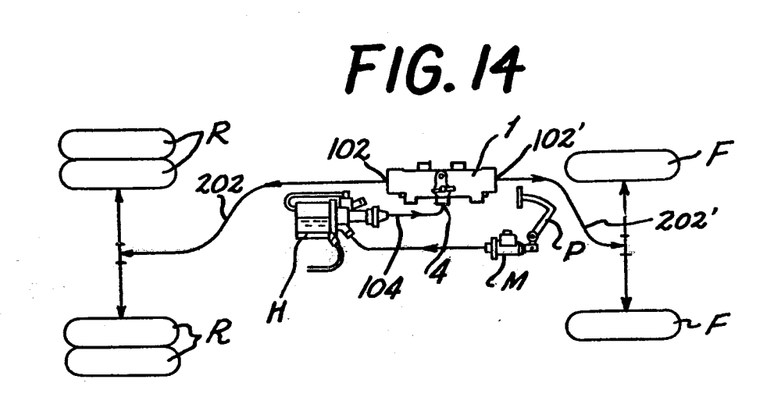
FIG. 14 is a diagrammatic view showing a typical installation of the control cylinder device of the present invention.

In a first form of the invention, shown diagrammatically in FIG. 14, inlet 4 is connected by a hydraulic line formed by suitable conduit means 104 to a hydraulic pressure developing means, for example, a master cylinder M and a booster H, the master cylinder M being actuated by brake pedal P. In this form, the control cylinder outlets 102, 102' are connected by a hydraulic line formed by conduit means 202, 202' to brake cylinders at rear and front wheels R,R and F,F respectively.

Figures 6, 7:
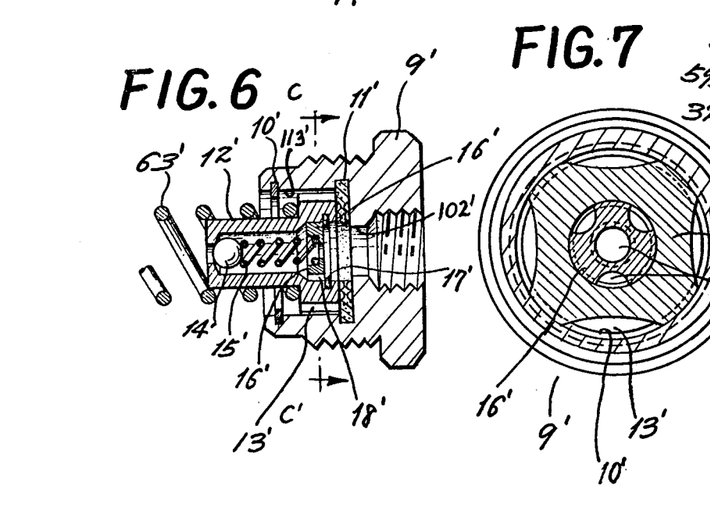
FIG. 6 is an enlarged view of the structure enclosed within the circle "A₂" of FIG. 2.
FIG. 7 is an enlarged sectional view of FIG. 6 taken along the line C—C' thereof.

Plugs 9, 9' also carry valve means which normally permits passage of pressurized fluid through outlets 102, 102'. As shown in FIGS. 2 and 6, the valve means at plug 9' includes a sleeve 12' located in a bore 113' formed in plug 9' and retained therein by a snap ring 10'. Sleeve 12' has passages 13' formed therein.

This valve means also includes a compression spring 15' within sleeve 5' caged between a valve ball 14' and a spring cup 16' held in place within the sleeve 12 by a snap ring 17'. Spring 15' normally biases the ball 14' into seating relation with an opening 114' in sleeve 12'. Sleeve 12' is normally biased into engagement with a packing 11' by a compression spring 63' but can move away from packing 11' to permit passage of fluid pressure through passages 13'.

The construction of the valve means at the plug 9 is identical to that described above at plug 9', and similar numbers (omitting the prime) illustrate corresponding parts for the valve means at plug 9.

Figure 3:
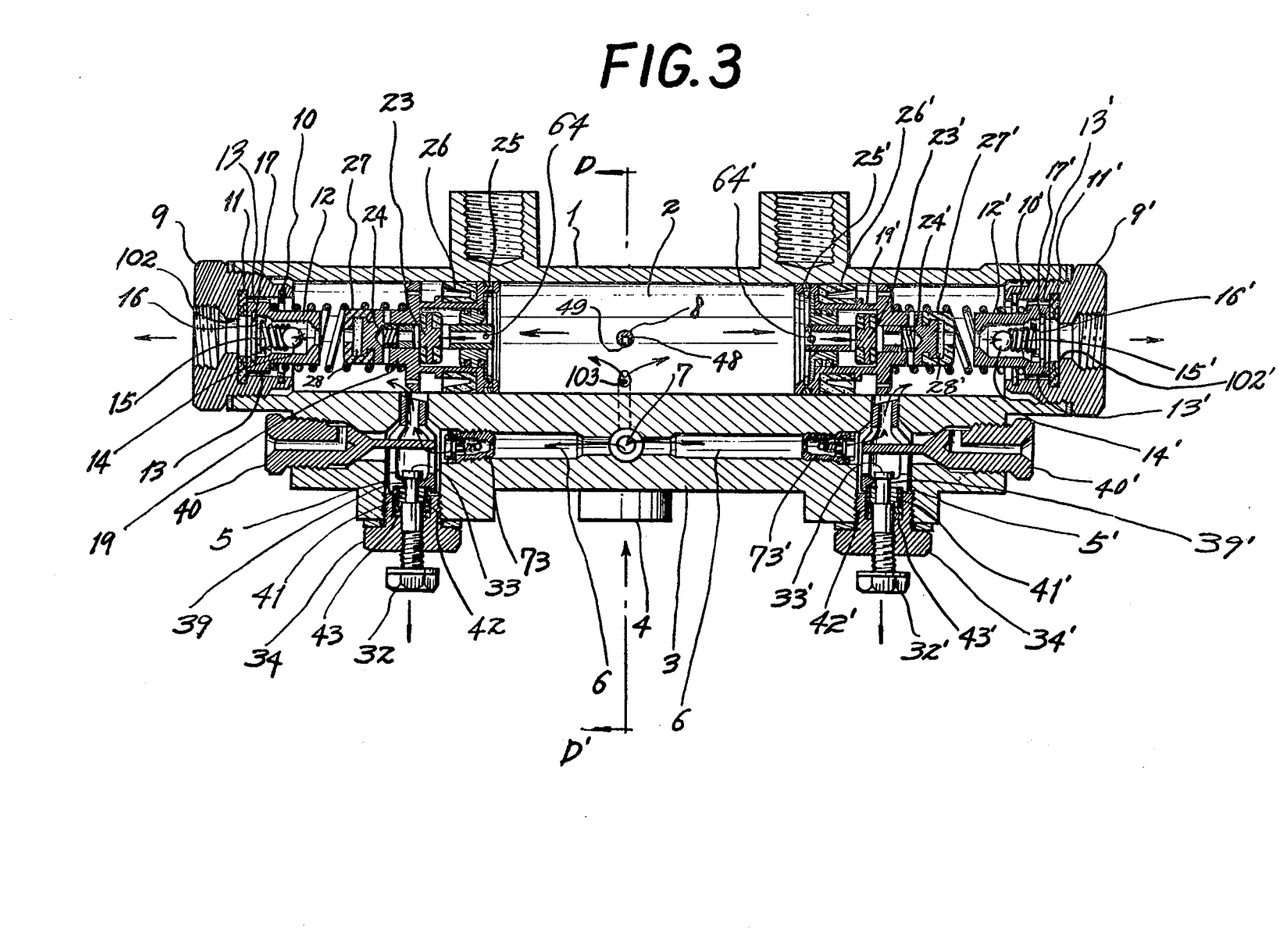
FIG. 3 is a view similar to FIG. 2 and showing the parts in position during bleeding of air from the system.
Figure 4:
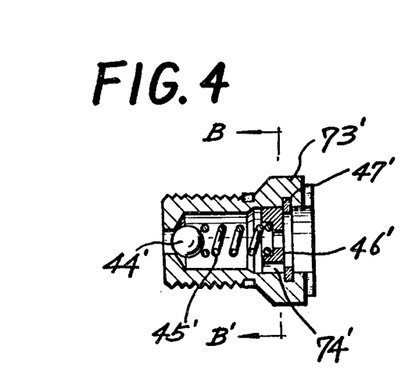
FIG. 4 is an enlarged view of the structure enclosed within the circle "A₁" of FIG. 2.
Figure 5:
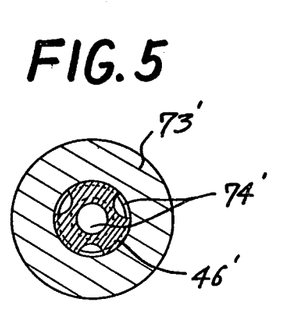
FIG. 5 is an enlarged sectional view of FIG. 4 taken along the line B—B' thereof.

Piston means is slidably disposed in the bore 2 and is operable in response to hydraulic pressure in the system. The piston means includes a pair of pistons 19, 19' movable toward and away from outlets 102, 102', respectively. As seen in FIGS. 2 and 3, piston 19' includes valve means 23 provided with passage means 29', 31' which, when open, communicates fluid pressure from the inlet 4' past piston 19' to the outlet 102'. The valve means 23' in piston 19' is normally positioned so that passage means 29', 31' are open (FIG. 2), but is movable relative to piston 19' to close the passage means 29', 31' [FIGS. 9(A), 9(B), 13].

Similarly, piston 19 includes passage means 29, 31 which are normally open and communicate pressurized fluid from inlet 4 to inlet 102', but which close upon movement of valve means 23 relative to piston 19.

Piston 19' is normally spaced from valve sleeve 12' by compression spring 63'. However, under certain circumstances as described below, piston 19' moves toward the valve sleeve 12' bringing a rubber packing 27' on piston 19' into engagement with valve sleeve 12'. (See FIG. 13). Piston 19' also carries a rubber packing 25' and a cup packing 26' to engage the wall of bore 2 to prevent the leakage of hydraulic fluid therepast.

Piston 19 is similarly provided with rubber packings 27, 25, cup packing 26, and a compression spring 63.

Pistons 19, 19' are limited in their travel toward each other by engagement with a center pin 48 extending through the bore 2. Thus, the position of the parts with no hydraulic pressure applied at the inlet 4 is as shown in FIG. 2 with the pistons 19, 19' held in engagement with the center post 48 by springs 63, 63', respectively. In addition, valve sleeves 12, 12' being acted upon by springs 63, 63' are held in engagement with packings 11, 11'.

Figure 9A:
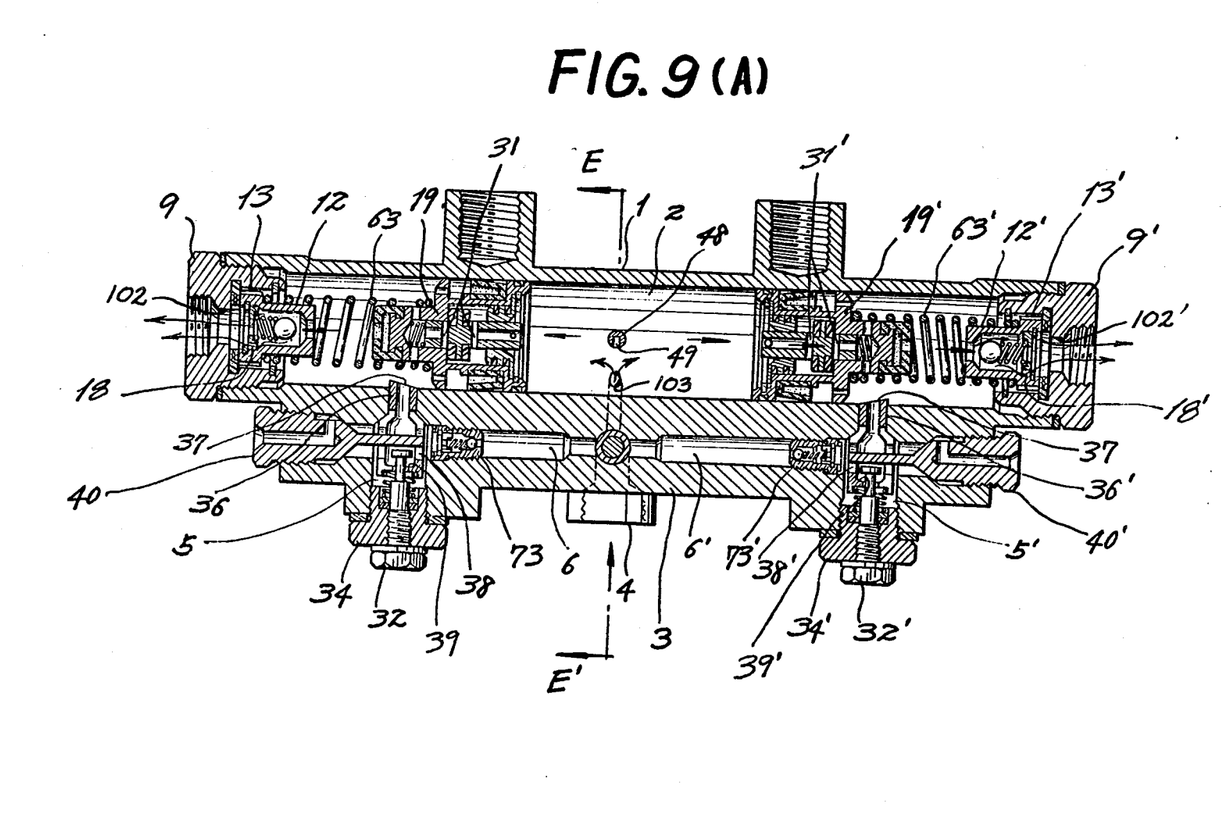
FIG. 9(A) is a view similar to FIG. 2 and showing the parts in position during normal actuation of the hydraulic pressure developing means amd application of the brakes.
Figure 9B:
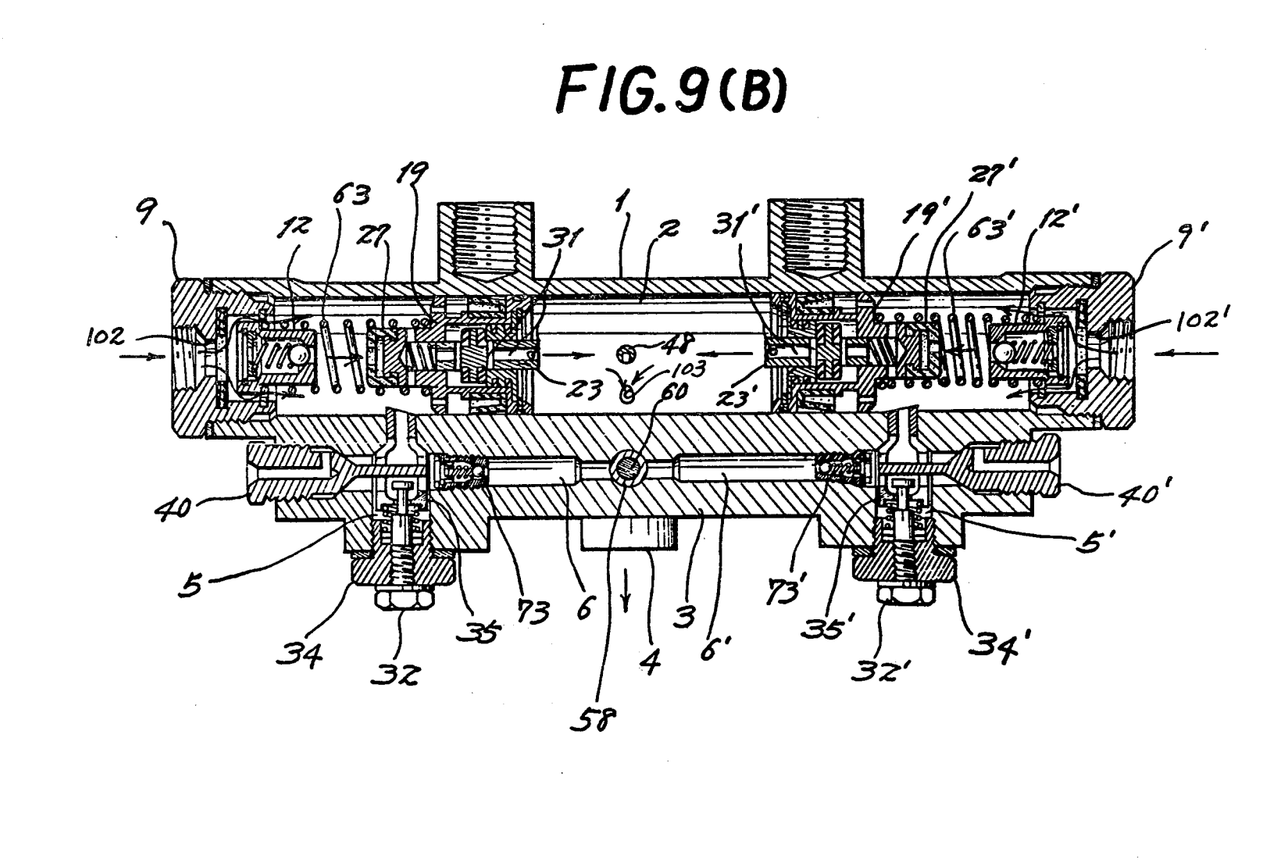
FIG. 9(B) is a view similar to FIG. 9(A) and showing the position of the parts and the flow of hydraulic fluid as hydraulic pressure at the pressure developing means is released following brake application.

When brake pedal P is first actuated, pressurized fluid is admitted to inlet 4 from the booster H through line 104 and valve means 23, 23' move against springs 24, 24' and close passageway means 29, 31 and 29', 31'. Continued application of the brake pedal P causes the pistons 19, 19' to move away from one another as shown in FIG. 9(A). Pressurized fluid in bore 2 unseats valve balls 14, 14' and, upon the described movement of pistons 19, 19' to the position shown in FIG. 9(A) causes pressurization of the brake cylinders at front and rear wheels F, F, and R, R.

When the brake pedal P is released, fluid pressure at inlet 4 is also released so that pistons 19, 19' begin to move toward the center post 48 under the force of springs 63, 63'. Valve 23, 23' shift initially to an open position and then to another closed position shown in FIG. 9(B). Valve balls 14, 14' move into seated relation with the valve sleeves 12, 12' closing openings 114, 114'. However sleeves 12, 12' unseat from the packings 11, 11' and allow pressurized fluid through passages 13, 13' around the valve sleeves 12, 12'. When pistons 19, 19' engage center post 48, the parts are again positioned as shown in FIG. 2.

Figure 13:
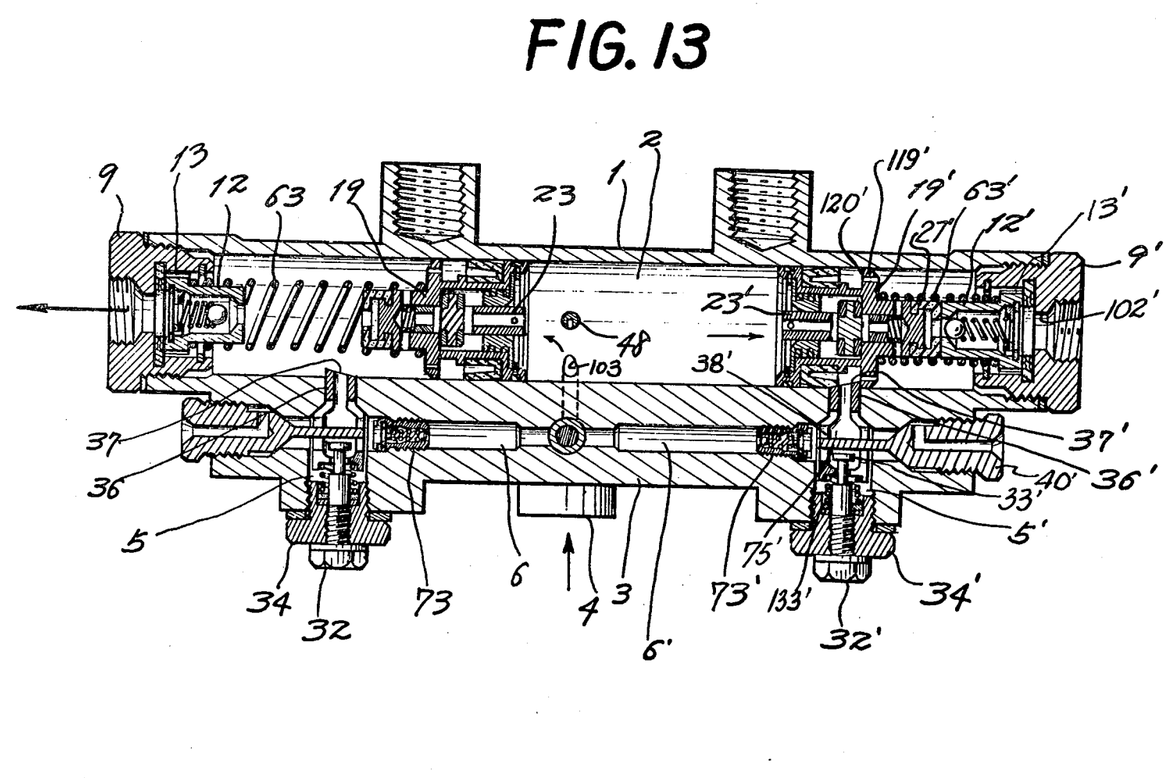
FIG. 13 is a view similar to FIG. 9(A) but showing the position of the parts when there is a failure of brake pressure at one set of wheel cylinders.

FIG. 13 illustrates the position of the parts when there is a loss of brake pressure at the wheel cylinders supplied by outlet 102' such as by failure of one of those wheel cylinders, or by a leak in the hydraulic line 202' associated therewith. When this occurs, fluid pressure in front of the piston 19' drops rapidly, so that piston 19' moves toward the right until packing 27' engages the valve sleeve 12'. Fluid pressure in bore 2 also moves valve means 23' toward the right and closes passage means 29', 31'.

Thus, in this position of the parts, outlet 102' is sealed off from bore 2. At the same time, however, fluid pressure in the system continues to pressurize the rear wheel cylinders connected to outlet 102 through conduit means 202 so that the vehicle can be brought to a safe stop.

During this movement of parts and as shown in FIG. 13, a flange 119' on piston 19' moves past the end 36' of a safe braking pin 35' and the latter engages behind a shoulder 120' on the piston flange 119'. Pin end 36' is tapered at 37' to permit piston flange 119' to move past pin 36' and a spring 41' returns pin 35' into locking engagement behind shoulder 120'. This holds packing 27' in engagement with valve sleeve 12'. Thus, there is no further loss of hydraulic fluid from the system even if the brake pedal P is released and reapplied.

When the leak in the hydraulic system is repaired, the pin 35' is withdrawn from locking engagement with piston 19'. This is achieved by turning a bolt 32' until an enlarged head 33' on the inner end of bolt 32' engages and pulls pin 35' radially outwardly of the bore 2. (See also FIG. 3). A guiding pin 75' on threaded plug 40' extends through a slot 38' in pin 35' and prevents pin 35' from turning. When pin 35' is withdrawn, spring 63' returns piston 19' to the position shown in FIG. 2.

Figure 15:
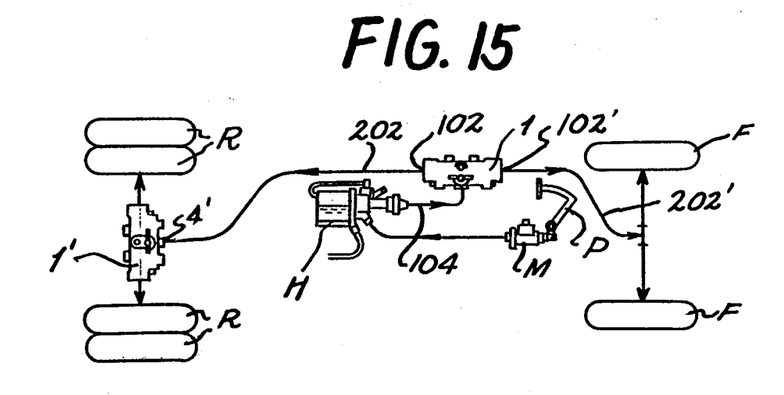
FIG. 15 is a view similar to FIG. 14 but showing an installation using two control cylinder devices constructed according to the present invention.

In the construction described above, one control cylinder device is employed in a vehicle having one set of front wheel brake cylinders and one set of rear wheel brake cylinders, as illustrated schematically in FIG. 14. If desired, a vehicle of this type can employ two such control cylinder devices in an arrangement illustrated schematically in FIG. 15. In this arrangement, a first control cylinder device 1 has one outlet 102' connected to the front wheel cylinders in the same fashion as in FIG. 14. However, the other outlet 102 is connected by conduit means 202 to an inlet 4 for a second control cylinder device 1'. The second control cylinder device is in turn, has its outlets connected to respective ones of the brake cylinders at rear wheels R,R.

In this version, the operation is the same as in the version illustrated in FIG. 14 with the exception that since the outlets of the second master cylinder device 1' are connected to the individual rear wheel brake cylinders, failure of brake pressure at one of the rear wheel brake cylinders has no effect on the braking action at the other rear wheel brake cylinder. Thus, the safe braking effect provided in the FIG. 15 version is even more improved. This is especially effective in heavy vehicles, for example, heavy trucks and buses.

Figure 8:
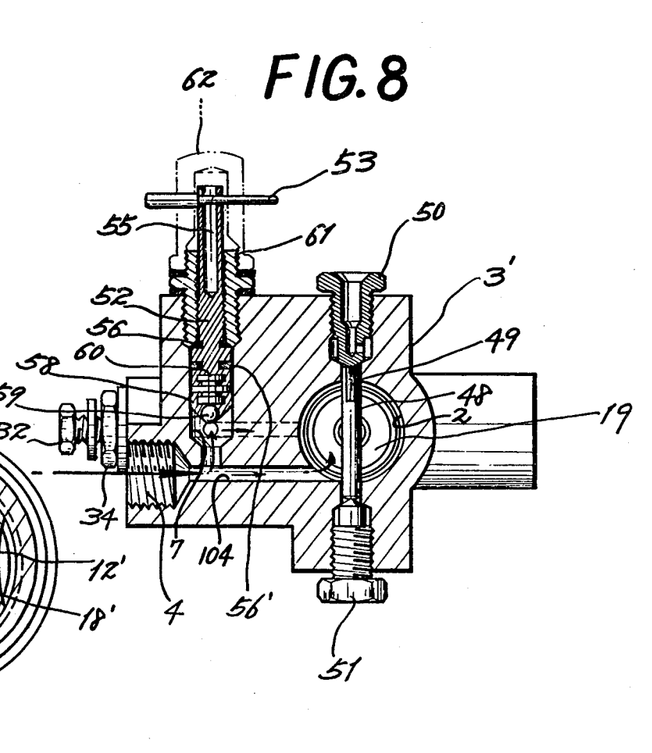
FIG. 8 is an enlarged sectional view of FIG. 3 taken along the line D—D' thereof.

FIG. 3 illustrates the position of the parts in the control cylinder device of the present invention when it is desired to bleed air from the system. At this time, a post 52 is threaded upwardly within a nut 61 using a handle 53 in a manner shown in FIG. 8. This releases a ball 59 so that inlet 4 is now communicated with passages 6, 6' through bore 7.

In addition, locking pins 35, 35' are retracted by threaded movement of bolts 32, 32' to the position shown in FIG. 3.

When brake pedal P is actuated, pressurized fluid at inlet 4 flows through passages 6, 6', past valve balls 44, 44', in sleeves 73, 73', and through pins 35, 35' into the bore 2 forwardly of pistons 19, 19'. Valve balls 14, 14' are unseated from sleeves 12, 12' so that conduit means 202, 202' are connected to bore 2. By opening a suitable valve at each wheel cylinder, air is successfully bled from the system.

The hydraulic lines are momentarily open at each of the brake cylinders during air bleed as described. However, since the pins 35, 35' are withdrawn from the bore 2 during air bleed, as shown in FIG. 3, the pistons 19, 19' return freely to the FIG. 2 position after air bleed is completed.

Figure 10:
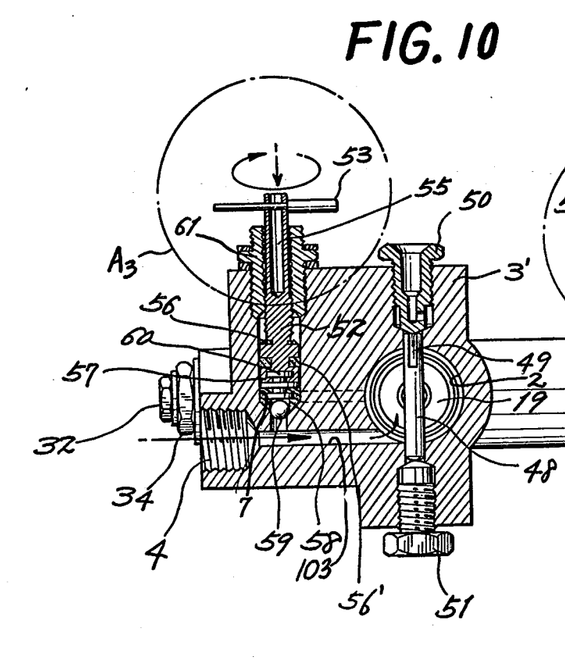
FIG. 10 is an enlarged sectional view of the structure of FIG. 9(A) taken along the lines E—E' thereof and showing the position of parts when air is bled from the system.
Figures 11, 12:
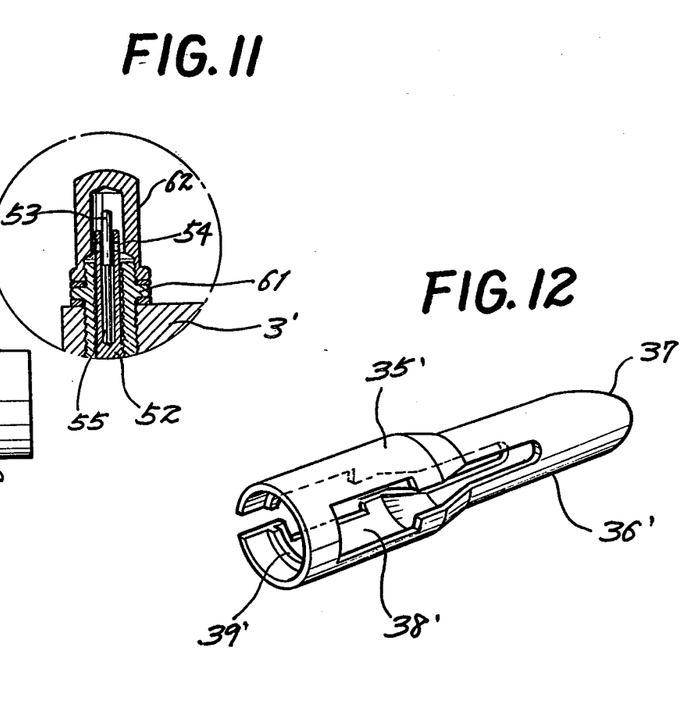
FIG. 11 is an enlarged view of the structure within the enclosure "A" of FIG. 10 and showing the position of the parts after bleeding air from the system.
FIG. 12 is a perspective view of a safe brake pin constructed according to the present invention.

When the bleeding action is terminated, post 52 is threaded downwardly to reseat valve ball 59, as shown in FIG. 10, and handle 53 is repositioned in an opening 55 in post 52 and is covered by a cap 62. Locking pins 35, 35' are then released by turning the bolts 32, 32', and the parts returned to the position shown in FIG. 2.

By the foregoing, there has been disclosed an improved safety hydraulic brake system for automotive vehicles calculated to fulfill the inventive objects set forth above. While preferred embodiments of the present invention have been illustrated and described above in detail, various additions, substitutions, modifications and omissions may be made thereto without departing from the spirit of the invention.

What is claimed is:

1. A safety hydraulic brake system for automotive vehicles having at least one set of front wheels and one set of rear wheels and brake cylinders at each wheel, a control cylinder having a first outlet communicated with brake cylinders at said front wheels and a second outlet communicated with brake cylinders at said rear wheels, said control cylinder having an inlet communicated with hydraulic pressure developing means, said control cylinder including bore means communicated with said first and second outlets, first and second piston means in said bore means, first and second valve means in said bore means and operable to permit pressurization of said front and rear wheel brake cylinders upon actuation of said hydraulic pressure developing means, said first and second piston means being operable to effect closing of said first or second valve means upon actuation of said hydraulic pressure developing means and upon loss of pressure at said front or rear wheel cylinders, respectively, whereby to prevent loss of pressure at the other of said front and rear wheel cylinders, said first and second piston means each including a bypass valve means operable to permit hydraulic fluid to pass said piston means, said bypass valve means closing upon initial pressurization of said front and rear wheel brake cylinders, and upon fluid pressure release, said bypass valve means shifts initially to an open position and then to another closed position while said first and second valve means shift to a closed position.

2. A safety hydraulic brake system as defined in claim 1 which further includes spring means normally biasing said piston means away from said first and second valve means to insure pressurization of said rear and front wheel brake cylinders on actuation of said hydraulic pressure developing means.

3. A safety hydraulic brake system as defined in claim 1 which includes a second control cylinder having an inlet communicated with said second outlet of said first mentioned controlled cylinder, said second control cylinder having first and second outlets communicated with individual brake cylinders at said rear wheels, said second control cylinders having bore means, a first and second piston means, and first and second valve means and being operable to effect closing of said first or second valve means upon actuation of said hydraulic pressure developing means and upon loss of pressure at one of said rear wheel cylinders, whereby to prevent loss of pressure at the other of said wheel cylinders.

4. A safety hydraulic brake system as defined in claim 1 wherein said bore means includes a through bore in said cylinder, first and second valve plugs at opposite ends of said through bore, said first and second valve means being mounted in said first and second valve plugs respectively, and including a valve sleeve mounted and retained in a respective one of said valve plugs, a valve ball in said valve sleeve, spring means normally biasing said valve ball in a direction to close a port in said valve sleeve, means defining passage means between said valve sleeve and said valve plug and adapted to permit passage of pressurized fluid around said valve sleeve independently of said port, spring means normally biasing said valve sleeve in a direction to close said passage means, said valve sleeve being movable in a direction to open said passage means on release of hydraulic pressure at said brake cylinders.

5. A safety hydraulic brake system as defined in claim 1 wherein said piston means moves in said bore means and engages said first or second valve means on loss of pressure at said front or rear wheel cylinders, respectively, means operable to retain said piston means in engagement with said valve means upon loss of pressure, said retaining means including a pair of members operable to engage a respective one of said piston means upon travel of said piston means into engagement with a respective one of said valve means, whereby to prevent further loss of pressure in said system upon release and reactuation of said hydraulic pressure developing means, said retaining members being manually releasable to permit withdrawal of said piston means from engagement with said valve means.

6. A safety hydraulic brake system as defined in claim 5 wherein said members each include a pin normally biased in the direction inwardly of said bore means, said piston means and said pins having cooperatively engageable camming surfaces adapted to permit movement of said piston means into engagement with said valve means but preventing withdrawal of said piston means from said valve means until said pin means is withdrawn radially of said bore means.

7. A safety hydraulic brake system as defined in claim 5 wherein said control cylinder is provided with normally closed passage means connecting said inlet to said outlet and bypassing said piston means, said normally closed passage means being manually operable to permit air to be bled from said system, and means for manually withdrawing said retaining means to prevent engagement with said piston means during bleeding of air from said system.

* * * * *

UNITED STATES PATENT AND TRADEMARK OFFICE
CERTIFICATE OF CORRECTION

PATENT NO. : 4,159,755
DATED : July 3, 1979
INVENTOR(S) : Byung Kuk Kang, Jin C. So, Tae H. Chung, Won Choi It is certified that error appears in the above-identified patent and that said Letters Patent are hereby corrected as shown below:

On the title page, under the heading "Inventors" the phrase "all of D.P.R. of Korea" should be corrected to read --all of the Republic of Korea--.

Signed and Sealed this

First Day of April 1980

[SEAL]

Attest:

SIDNEY A. DIAMOND

Attesting Officer

Commissioner of Patents and Trademarks